United States Patent [19]
Pojar et al.

[11] Patent Number: 5,496,526
[45] Date of Patent: Mar. 5, 1996

[54] PRODUCTION OF INTERMEDIATE GRADE MANGANESE CONCENTRATE FROM LOW GRADE MANGANIFEROUS ORES

[75] Inventors: Michael G. Pojar, Lino Lakes; John C. Nigro, Bloomington, both of Minn.

[73] Assignee: The United States of America as represented by the Secretary of the Interior, Washington, D.C.

[21] Appl. No.: 130,080

[22] Filed: Aug. 30, 1993

[51] Int. Cl.$^6$ .............................. C22B 47/00; C22B 1/00; C01G 49/00; B03C 1/30

[52] U.S. Cl. ...................... 423/49; 423/DIG. 4; 423/594; 75/749; 209/11; 209/39; 241/23

[58] Field of Search .................................. 423/49, DIG. 4, 423/594; 75/749, 624, 625; 209/7, 11, 12, 39; 241/23

[56] References Cited

U.S. PATENT DOCUMENTS

| | | | |
|---|---|---|---|
| 1,710,522 | 4/1929 | Trumbo et al. | 209/12 |
| 1,937,039 | 11/1933 | Johnston et al. | 209/11 |
| 1,939,119 | 12/1933 | Holt et al. | 209/12 |
| 2,038,399 | 4/1936 | Westby | 423/49 |
| 2,191,819 | 2/1940 | Albin | 75/625 |
| 2,468,586 | 4/1949 | Braund | 209/39 |
| 2,990,124 | 6/1961 | Cavanagh et al. | 209/12 |
| 3,037,856 | 6/1962 | Udy | 75/625 |
| 3,502,271 | 3/1970 | Hays | 209/39 |
| 3,864,118 | 2/1975 | Schumacher | 423/49 |
| 5,190,740 | 3/1993 | Narutani et al. | 423/594 |

FOREIGN PATENT DOCUMENTS

| | | | |
|---|---|---|---|
| 1468596 | 3/1989 | U.S.S.R. | 241/23 |
| 321943 | 11/1929 | United Kingdom | 423/49 |

OTHER PUBLICATIONS

Richards, R. H., et al, Textbook of Ore Dressing, 1940, pp. 300–303.

*Primary Examiner*—Steven Bos
*Attorney, Agent, or Firm*—E. Philip Koltos

[57] ABSTRACT

A process for producing intermediate grade manganese concentrate from low grade manganiferous ores is disclosed. A low grade manganiferous ore containing silicon, iron, between 1 and 20 per cent manganese and oxides of silicon, iron and manganese is first crushed to reduce the size of the manganiferous ore to a fraction of its original size. The crushed manganiferous ore is then heated to a temperature sufficient to chemically transform the manganese and iron in the manganiferous ore to an artificial magnetic, manganese-iron spinel. The heat treated manganiferous ore is cooled, preferably by air, and then beneficiated by further crushing and grinding to liberate the artificial manganese iron spinel from the silicon and other oxides within the ore. Finally, the artificial manganese-iron spinel is magnetically separated from the silicon and other oxides within the ore to increase the concentration of the manganese and thereby provide an intermediate grade manganese concentrate.

7 Claims, 1 Drawing Sheet

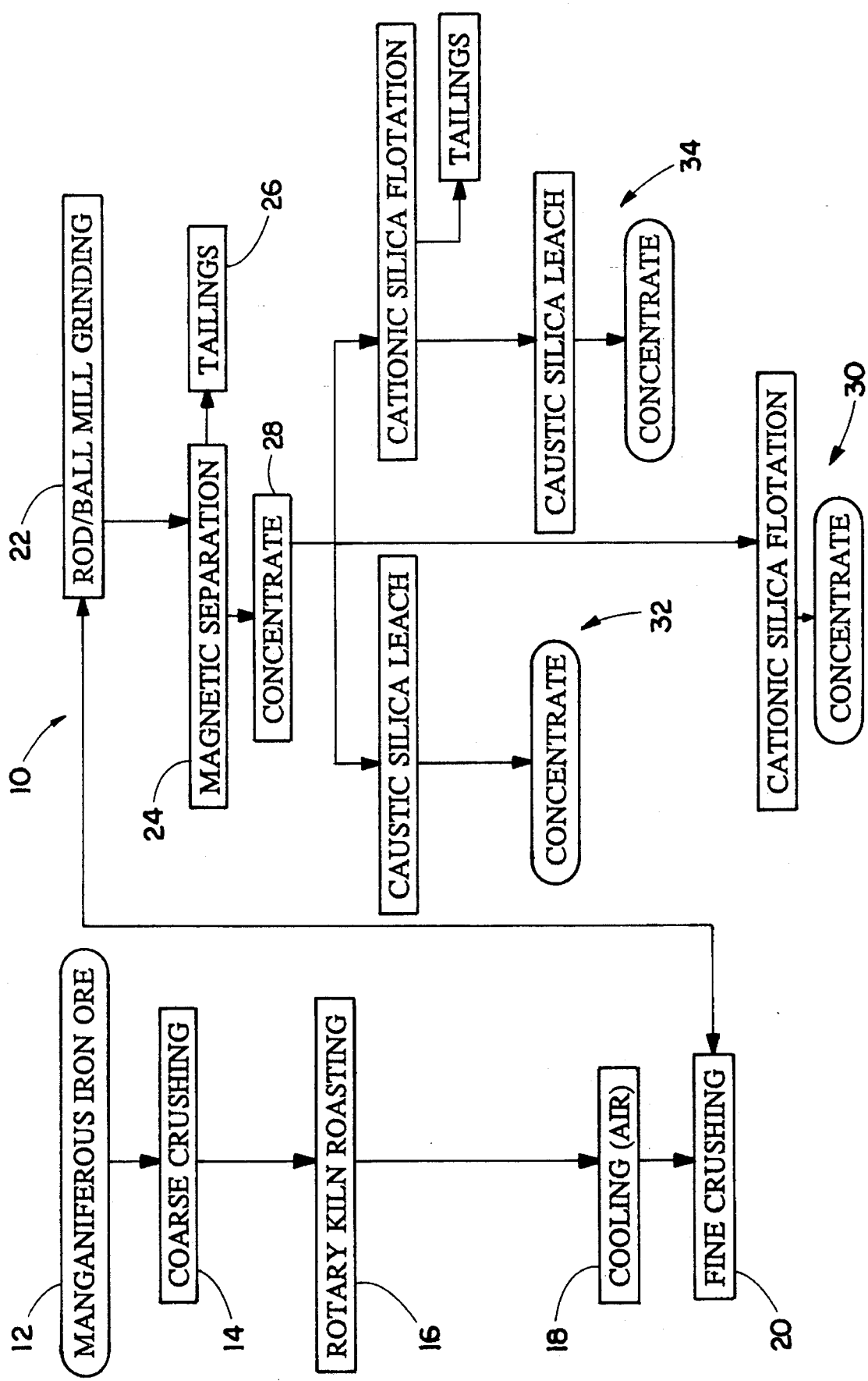

PRODUCTION OF INTERMEDIATE GRADE MANGANESE CONCENTRATE FROM LOW GRADE MANGANIFEROUS ORES

RIGHTS OF THE GOVERNMENT

The invention described herein may be manufactured and used by or for the Government of the United States of America for governmental purposes without the payment of any royalties thereon or therefor.

BACKGROUND OF THE INVENTION

1. Field of the Invention

The present invention relates generally to a process for forming intermediate grade manganese concentrate from low grade manganiferous ore and, more particularly, to such a process which chemically transforms low grade manganiferous ore to a moderately magnetic manganese-iron spinel which is amenable to concentration by low (standard) intensity magnetic separation.

2. Description of the Prior Art

In most recent history, the quest for discovery has been guided more out of a need than out of adventure. For example, man has discovered that many of the earth's critical minerals are in finite supply. For the United States, these minerals include chromium, platinum and manganese. As is apparent, these minerals are critical to our nation's economic stability and national security. On Jan. 7, 1987, manganese was certified by the U.S. Department of State as a strategic mineral essential for the economy and defense of the United States that is unavailable in adequate quantities from reliable and secure domestic suppliers. The problem created by this unavailability is aggravated since there is currently no satisfactory substitute for manganese in its major applications.

At present, the United States depends totally on imports for its manganese requirements. The main sources of manganese imports are the Republic of South Africa, France, Gabon and Brazil. Manganese ore containing between 35 and 54 per cent manganese and ferromanganese containing between 74 and 95 per cent manganese are imported for domestic consumption. The principal use of manganese is for the production of iron and steel, and its demand for this purpose far exceeds all other demands. Manganese is used by the steel industry chiefly in the form of ferromanganese or silicomanganese. Also, some producers of pig iron add manganese ore or manganiferous ore to their furnace burden.

Domestically, one of the largest deposits of manganese ore may be found in the Cuyana Range located in central Minnesota. These manganese ore deposits occur predominantly as carbonate and oxide minerals, and represent the most promising domestic land resource. These ores consist of impure oxides, principally pyrolusite, a lesser amount of rhodochorosite, goethite, hematite, magnetite and siliceous materials including quartz. Resource estimates from the 1981 Minnesota geological survey indicate that the Cuyana Range contains a minimum of 176 million long ton of marginally economic manganiferous rock with an average grade of 10.5 weight per cent manganese. It is estimated that the calculated 18.5 million long ton of manganese contained in the manganiferous rock could supply this country's needs for this important and strategic ore for approximately 30 years. Also, an additional resource of 6.9 million long ton of manganese is available in lower grade deposits.

Although the manganiferous rock present in the Cuyana Range is itself presently extractable by current surface mining techniques, the manganese in the manganiferous rock is not economically recoverable utilizing presently known separation processes. In addition, it is apparent that even if the manganese was recoverable from the manganiferous rock, the concentration of manganese itself is only marginally satisfactory for use in domestic iron and steel applications. As a result, the need to import manganese ore for domestic consumption continues.

Consequently, there is a need for a process for economically recovering manganese ore from manganiferous rock which also converts the low grade ore recovered to an intermediate grade manganese concentrate for subsequent use in iron and steel applications.

SUMMARY OF THE INVENTION

The present invention relates to a process for producing intermediate grade manganese concentrate from low grade manganiferous ores designed to satisfy the aforementioned needs. The process of the present invention utilizes a novel technique which emphasizes heat treatment of low grade manganiferous ore as a precursor to magnetic separation which upgrades the low grade manganese found in the ore to an acceptable manganese grade concentrate. Utilization of the process of the present invention allows a low grade manganiferous ore to be economically and rapidly converted to intermediate grade manganese concentrate particularly useful as a precursor in a wide range of iron and steel applications.

Accordingly, the present invention is directed to a process for producing intermediate grade manganese concentrate from low grade manganiferous ores. The process includes the steps of: (a) providing a low grade manganiferous ore containing silicon, iron, between 1 and 20 weight per cent manganese and oxides of silicon, iron and manganese; (b) crushing the low grade manganiferous ore to reduce the size of the manganiferous ore to a fraction of its original size; (c) heat treating the crushed manganiferous ore to a temperature sufficient to chemically transform the manganese and iron in the manganiferous ore to an artificial magnetic, manganese-iron spinel; (d) cooling the grinding treated manganiferous ore; (e) grinding the air cooled manganiferous ore to liberate the artificial manganese-iron spinel from the silicon and other oxides within the ore; and (f) magnetically separating the artificial manganese-iron spinel from the silicon and other oxides within the ore to increase the concentration of the manganese and thereby provide an intermediate grade manganese concentrate.

These and other features and advantages of the present invention will become apparent to those skilled in the art upon a reading of the following detailed description when taken in conjunction with the FIGURE wherein there is shown and described an illustrative embodiment of the process of the present invention.

BRIEF DESCRIPTION OF THE DRAWING

In the course of the following detailed description, reference will be made to the attached FIGURE wherein there is illustrated a flow diagram of the various steps forming the process of the present invention for producing intermediate grade manganese concentrate from low grade manganiferous ores.

DETAILED DESCRIPTION OF THE INVENTION

Referring now to the FIGURE, there is illustrated a flow diagram generally designated by the numeral 10 identifying the various steps of the process of the present invention for producing intermediate grade manganese concentrate from low grade manganiferous ores such as manganiferous iron ore. The process 10 has been successfully followed to upgrade manganiferous iron ore having a manganese content of between 7 and 10 per cent manganese to between a 20 and 25 per cent manganese concentrate. As will be described herein, the process of the present invention is economical to practice and converts low grade manganiferous ore to intermediate grade manganese concentrate relatively quickly. These beneficial features enhance its use as the preferred process for creating intermediate grade manganese concentrate as a precursor to utilizing the manganese concentrate for iron and steel applications.

The process 10 includes the first step 12 of obtaining low grade manganiferous iron ore typically containing silicon, iron, between 1 and 20 per cent manganese and other oxides of silicon, iron and manganese. The iron content may be between 15 and 50 per cent and the silicon content may be between 13 and 30 per cent. The balance of the manganiferous iron ore consists of oxygen in the form of oxides. This type of manganiferous iron ore may be found in both the northeastern and southeastern regions of the United States, as well as in oceanic crust and manganese sea nodules.

After suitable manganiferous iron ore is obtained, it is prepared for further processing by crushing (process step 14). The manganiferous iron ore is crushed to create ore formations of preferably between approximately 1 and 2 inches in diameter. Crushing to a finer size (i.e., −0.5 inch +10 mesh) is permissible. However, it has been found that crushing to form between 1 and 2 inch diameter formations reduces fusion upon ore heating and minimizes damage to heating furnace refractory linings.

After the manganiferous iron ore is crushed, it is placed in a furnace such as a conventional rotary kiln furnace for heat treating in an oxidizing (air) or neutral atmosphere (process step 16). The construction and theory of operation of a rotary kiln furnace are well known to those skilled in the art and thus will not be described herein. Upon placement in the furnace, the manganiferous material is first dried at approximately 600 degrees F. to drive out any waters of hydration. This may be achieved quickly, typically within 15 minutes or less. Drying is followed by intensive heating within the furnace to elevated temperatures of between approximately 1300 and 1500 degrees C. for a predetermined period of time, generally no longer than 60 minutes. The manganiferous iron ore is heat treated at a predetermined temperature and for a time sufficient to chemically transform the low grade manganiferous iron ore to an artificial magnetic, manganese-iron spinel complex known as jacobsite ($MnFe_2O_4$) which is amenable to concentration by low intensity magnetic separation.

As known in the art, the term "spinel" is generally used to describe a large number of oxides found in nature, in artificial laboratory preparations and in slags resulting from metallurgical operations. These structures are usually described as double oxides $AB_2S_4$ in which A is one or more divalent metals (i.e. —Mg, Fe, Zn, Mn, Ni), B is one or more trivalent metals (i.e. —Al, Fe, Cr, Mn, or $Ti_{+4}$) and X is oxygen. The most naturally occurring spinels fall into three series: (1) Spinel: $MgAl_2O_4$, (2) Magnetite: $Fe_3O_4$, and (3) Chromite: $(Mg, Fe)Cr_2O_4$. Jacobsite is considered relatively rare as a naturally occurring ore and is associated with the Magnetite series.

Spinel, magnetite, chromite and a number of isostructural oxides, including jacobsite, all have the spinel structure type. The structure is one in which both tetrahedral and octahedral voids are partially occupied by metal cations. Both the tetrahedral and octahedral voids cannot be fully occupied in this group because this would necessitate face-sharing of occupied voids. Electrostatic repulsion of the cations and resulting high-energy state prevents this from happening. In a normal spinel, the A cations occupy the tetrahedral site and the B cations occupy the octahedral sites. Several spinel minerals, however, have an inverted cation distribution with all of the A cations and half of the B cations filling the tetrahedral site. These spinels are referred to as inverse spinels and have the general formula $B[AB]X_4$ in which the bracket denotes cations in octahedral coordination. Jacobsite is an example of an inverse spinel and is written as $Fe_{+3}[Mn_{+2}Fe_{+3}]O_4^{-2}$. As will be described herein, jacobsite is the desired mineral complex for use in the process of the present invention.

As the crushed manganiferous iron ore reaches the maximum heating temperature of approximately 1500 degrees C., the manganese and iron become reconfigured within the crystal-lattice forming the desirable jacobsite spinel. The hotter the temperature achieved during rotary kiln furnace firing the shorter the time at temperature is required for jacobsite conversion. Although the broad range of heating has been determined to lie between 1300 and 1500 degrees C., the preferred heating range for heat treatment has been found to lie between 1300 and 1350 degrees C. In addition, the 60 minute heating period is considered to be an average time period and may actually range from between 15 and 90 minutes. At excessively longer heating periods over 90 minutes, little additional benefits are achieved.

After heat treating step 16 is complete, the heat treated manganiferous iron ore is cooled (process step 18), preferably by air, and thereafter subjected to further treatment to liberate the artificial manganese-iron spinel (jacobsite) from the silicon and other oxides within the manganiferous iron ore. This further treatment includes fine crushing the manganiferous iron ore (process step 20) and then finely grinding the crushed manganiferous iron ore to between −200 and −500 mesh particle size in a rod/ball mill grinder (process step 22). The combination of fine crushing and grinding liberates the manganese-iron (jacobsite) spinel from the silica gangue or waste remaining from the manganiferous iron ore.

The artificial manganese-iron spinel (jacobsite) is separated from the silica gangue or waste by passing the crushed and ground manganiferous iron ore over a conventional low-intensity magnetic separation device (process step 24). Preferably, the finely-ground artificial manganese-iron spinel, in slurry form is passed over a wet magnetic drum separator of the type currently used in the iron ore (taconite) industry. Magnetic strength is determined by brand and/or type of separator used. The low-intensity magnetic separation process will separate the artificial jacobsite form from the non-magnetic waste or tailings 26. As the non-magnetic tailings are removed from the mix of material during the magnetic separation step 24, the concentration of manganese remaining is increased from a low grade concentration of typically less than 10 per cent to an intermediate grade concentrate of between 20 and 25 per cent manganese. The intermediate grade concentrate manganese is illustrated in the flow diagram 10 by the numeral 28.

If desired, the intermediate grade manganese concentrate may be further upgraded by using either an optional cationic silica flotation process (process step 30), a caustic silica leach process (process step 32) or a combined cationic silica flotation/caustic silica leach process (process step 34). In the cationic silica flotation process 30, magnetic concentrates are placed in a flotation cell and conditioned with an amine reagent and a frother agent. The amine reagent and the frother agent are used to stimulate and effect the removal of further silica from the manganese-iron spinel. In the caustic silica leach process 32, silica is leached from the manganese-iron spinel, thereby enhancing its manganese grade. In the combined process 34, cationic silica flotation is followed by caustic silica leaching.

Test results utilizing the process of the present invention are presented in the following example.

EXAMPLE

A manganiferous iron ore sample containing 12.8 per cent manganese, 27.3 per cent iron and 19.5 per cent silicon was crushed and thereafter subjected to heat treatment in a rotary kiln furnace for 60 minutes at 1315 degrees C. to convert the iron and the manganese in the sample to jacobsite. After heating, the sample was subjected to air cooling, fine crushing and fine grinding to −325 mesh. The ground mixture was then passed in slurry form over a magnetic separation device twice. After magnetic separation, the resultant manganese concentrate was reduced to 63.3 per cent of the original sample weight, and included 18.5 per cent manganese, 32.0 per cent iron and 12.9 per cent silicon. Approximately 91.5 per cent of the manganese was recovered. The tailings produced after magnetic separation made up 36.7 per cent of the original sample by weight, and included 3.0 per cent manganese, 19.1 per cent iron and 30.8 per cent silicon. The magnetic concentrate sample was thereafter subjected to an optional caustic silica leach process at 60 degrees C. for 6.0 hours. After leaching, the sample included 23.1 per cent manganese, 39.0 per cent iron and 4.8 per cent silicon. All chemical values given were believed to be within +/−3 per cent of actual values.

It is thought that the present invention and many of its attendant advantages will be understood from the foregoing description and it will be apparent that various changes may be made in the form, and arrangement of the various steps of the invention described herein without departing from the spirit and scope of the invention or sacrificing all of its material advantages, the form hereinbefore described being merely a preferred or exemplary embodiment thereof.

We claim:

1. A process for producing intermediate grade manganese concentrate from low grade manganiferous ores, comprising the steps of:

(a) providing a low grade manganiferous ore containing silicon, iron, between 1 to 20 percent manganese and oxides of silicon, iron and manganese;

(b) crushing said low grade manganiferous ore to reduce the size of said manganiferous ore to a fraction of its original size.

(c) heat treating said low grade manganiferous ore, after crushing, in a atmosphere selected from the group consisting of an oxidizing atmosphere and a neutral atmosphere to a temperature between 1300 and 1500 degrees C. to chemically transform the manganese and iron in said manganiferous ore to an artificial magnetic, manganese-iron spinel;

(d) cooling said manganiferous ore, after heat treating;

(e) fine crushing and then fine grinding said manganiferous ore, after cooling, to between −200 to −500 mesh particle size to liberate said artificial manganese-iron spinel from the silicon and other oxides within said ore; and (f) magnetically separating said artificial manganese-iron spinel from the silicon and other oxides within said ore to increase the concentration of said artificial manganese-iron spinel and thereby provide an intermediate grade manganese concentrate containing at least 20 percent manganese.

2. The process for producing intermediate grade manganese concentrate as recited in claim 1, wherein said intermediate grade manganese concentrate contains between 20 and 25 per cent manganese.

3. The process for producing intermediate grade manganese concentrate as recited in claim 1, wherein said crushing step (b) includes crushing said low grade manganiferous ore to create ore formations of between approximately 1 and 2 inches in diameter.

4. The process for producing intermediate grade manganese concentrate as recited in claim 1, wherein said heat treating step (c) includes first drying said low grade manganiferous ore at approximately 600 degrees F. for between 5 to 15 minutes to drive out any waters of hydration before heating said low grade manganiferous ore to between 1300 and 1500 degrees C.

5. The process for producing intermediate grade manganese concentrate as recited in claim 1, wherein said heat treating step is performed for between 15 to 90 minutes.

6. The process for producing intermediate grade manganese concentrate as recited in claim 1, further comprising the step of subjecting said manganese concentrate provided in step (f) to a cationic silica flotation to remove additional silica from the manganese-iron spinel.

7. The process for producing intermediate grade manganese concentrate as recited in claim 1, further comprising the step of subjecting said manganese concentrate provided in step (f) to a caustic silica leach to remove silica from the manganese-iron spinel.

* * * * *